(12) United States Patent
Miura et al.

(10) Patent No.: US 10,560,548 B2
(45) Date of Patent: Feb. 11, 2020

(54) DELIVERY SYSTEM, DELIVERY METHOD, AND DELIVERY PROGRAM

(71) Applicant: Sony Computer Entertainment Inc., Tokyo (JP)

(72) Inventors: Takeshi Miura, Tokyo (JP); Shinichi Tanaka, Kanagawa (JP); Tetsuo Watanabe, Tokyo (JP); Daizo Nagahara, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 175 days.

(21) Appl. No.: 14/598,761

(22) Filed: Jan. 16, 2015

(65) Prior Publication Data
US 2015/0215425 A1    Jul. 30, 2015

(30) Foreign Application Priority Data

Jan. 29, 2014    (JP) .................. 2014-014948

(51) Int. Cl.
*H04L 29/08*    (2006.01)
(52) U.S. Cl.
CPC .................... *H04L 67/34* (2013.01)
(58) Field of Classification Search
CPC ...................................................... H04L 67/34
See application file for complete search history.

(56) References Cited

U.S. PATENT DOCUMENTS

| | | | | |
|---|---|---|---|---|
| 7,418,390 B1* | 8/2008 | Jokipii | .................. | G06F 17/289 704/2 |
| 8,142,282 B2* | 3/2012 | Canessa | .................. | G07F 17/32 463/29 |
| 8,267,791 B2* | 9/2012 | Sugiyama | ............... | A63F 13/12 463/40 |
| 8,393,967 B2* | 3/2013 | Farrier | .................... | A63F 13/12 463/42 |
| 8,625,805 B1* | 1/2014 | Statica | .................. | H04L 9/0822 380/284 |

(Continued)

FOREIGN PATENT DOCUMENTS

| JP | 2001-251341 | 9/2001 |
|---|---|---|
| JP | 2008-287614 | 11/2008 |

(Continued)

OTHER PUBLICATIONS

Japanese Notification of Reason for Refusal dated Nov. 17, 2015 from corresponding Application No. 2014-014948.

*Primary Examiner* — Blake J Rubin
(74) *Attorney, Agent, or Firm* — Katten Muchin Rosenman LLP

(57) ABSTRACT

Disclosed herein is a delivery system including a delivery apparatus. The delivery apparatus includes a setting information acquisition section configured to acquire setting information set to a terminal on which an application is executed on the basis of the setting information, a terminal section configured to have at least part of functions of the terminal and execute an application in accordance with an instruction from the terminal on the basis of the setting information acquired by the setting information acquisition section, and a delivery section configured to deliver image information based on the execution of the application to one of the terminal and a terminal related to the terminal.

13 Claims, 3 Drawing Sheets

(56) References Cited

U.S. PATENT DOCUMENTS

| | | | |
|---|---|---|---|
| 8,774,536 B1* | 7/2014 | Jia | G06K 9/00979 382/232 |
| 9,015,784 B2* | 4/2015 | Perlman | A63F 13/30 463/40 |
| 9,043,845 B2* | 5/2015 | Davis | H04N 21/458 725/62 |
| 9,055,066 B2* | 6/2015 | Kim | H04L 65/4084 |
| 9,773,020 B2* | 9/2017 | Kerr | H04L 67/26 |
| 2002/0128068 A1* | 9/2002 | Randall Whitten | A63F 13/10 463/43 |
| 2002/0137565 A1* | 9/2002 | Blanco | A63F 13/10 463/46 |
| 2003/0003988 A1* | 1/2003 | Walker | G06Q 30/02 463/21 |
| 2004/0128319 A1* | 7/2004 | Davis | A63F 13/12 |
| 2004/0157655 A1* | 8/2004 | Tsugiiwa | A63F 13/10 463/9 |
| 2005/0187001 A1* | 8/2005 | Fishel | A63F 1/04 463/9 |
| 2007/0124675 A1* | 5/2007 | Ban | G06F 9/454 715/703 |
| 2007/0132787 A1* | 6/2007 | Ko | G06F 3/14 345/660 |
| 2007/0157173 A1* | 7/2007 | Klein | G06F 16/40 717/122 |
| 2008/0046916 A1* | 2/2008 | Shivaji-Rao | H04N 7/17318 725/25 |
| 2008/0242409 A1* | 10/2008 | Schueller | A63F 13/12 463/31 |
| 2008/0288380 A1* | 11/2008 | Nam | A63F 13/12 705/34 |
| 2009/0098942 A1* | 4/2009 | Fukuda | A63F 13/12 463/42 |
| 2009/0102616 A1* | 4/2009 | Stone | A63F 13/10 340/309.9 |
| 2009/0118019 A1* | 5/2009 | Perlman | A63F 13/12 463/42 |
| 2009/0137205 A1* | 5/2009 | Ketwich | H04M 1/7253 455/41.2 |
| 2009/0197681 A1* | 8/2009 | Krishnamoorthy | A63F 13/12 463/42 |
| 2009/0198789 A1* | 8/2009 | Young | A63F 13/10 709/213 |
| 2009/0325711 A1* | 12/2009 | Bronstein | A63F 13/10 463/42 |
| 2010/0184516 A1* | 7/2010 | Matsumura | A63F 13/12 463/42 |
| 2011/0093820 A1* | 4/2011 | Zhang | A63F 13/06 715/863 |
| 2011/0107220 A1* | 5/2011 | Perlman | A63F 13/12 715/720 |
| 2011/0126110 A1* | 5/2011 | Vilke | G06F 9/54 715/736 |
| 2011/0225417 A1* | 9/2011 | Maharajh | G06F 21/10 713/150 |
| 2011/0314093 A1* | 12/2011 | Sheu | G06F 9/4445 709/203 |
| 2012/0004042 A1* | 1/2012 | Perry | A63F 13/30 463/42 |
| 2012/0094757 A1* | 4/2012 | Vago | H04L 67/42 463/31 |
| 2012/0130856 A1* | 5/2012 | Petri | G06Q 30/0623 705/26.61 |
| 2012/0142429 A1* | 6/2012 | Muller | A63F 13/45 463/42 |
| 2012/0265604 A1* | 10/2012 | Corner | G06Q 30/02 705/14.39 |
| 2012/0274641 A1* | 11/2012 | Diard | G06T 15/005 345/428 |
| 2012/0277003 A1* | 11/2012 | Eliovits | A63F 13/87 463/42 |
| 2012/0278439 A1* | 11/2012 | Ahiska | H04L 65/105 709/218 |
| 2012/0302346 A1* | 11/2012 | Layne, IV | A63F 13/77 463/36 |
| 2012/0309539 A1* | 12/2012 | Smith | A63F 13/795 463/42 |
| 2012/0311564 A1* | 12/2012 | Khalid | G06F 8/61 718/1 |
| 2012/0315993 A1* | 12/2012 | Dumont | G07F 17/3225 463/42 |
| 2012/0324519 A1* | 12/2012 | Laughlin | H04N 21/23439 725/95 |
| 2013/0023340 A1* | 1/2013 | Lee | H04N 21/234363 463/30 |
| 2013/0035165 A1* | 2/2013 | Satake | H04L 29/06034 463/42 |
| 2013/0059654 A1* | 3/2013 | Oh | A63F 13/77 463/29 |
| 2013/0076750 A1* | 3/2013 | Park | G09G 3/36 345/428 |
| 2013/0097220 A1* | 4/2013 | Lyons | H04L 65/607 709/203 |
| 2013/0103789 A1* | 4/2013 | Kawamoto | H04L 67/38 709/217 |
| 2013/0152139 A1* | 6/2013 | Davis | H04N 21/482 725/61 |
| 2013/0182186 A1* | 7/2013 | Ikenaga | H04N 5/38 348/723 |
| 2013/0244784 A1* | 9/2013 | Assa | G06F 3/0488 463/40 |
| 2013/0260883 A1* | 10/2013 | Kim | A63F 13/10 463/31 |
| 2013/0268687 A1* | 10/2013 | Schrecker | H04W 12/06 709/229 |
| 2013/0278631 A1* | 10/2013 | Border | G02B 27/017 345/633 |
| 2013/0324244 A1* | 12/2013 | Mikhailov | A63F 13/04 463/31 |
| 2013/0326490 A1* | 12/2013 | Anderson | G06F 11/36 717/140 |
| 2014/0002753 A1* | 1/2014 | Griffin | H04W 88/06 348/734 |
| 2014/0051498 A1* | 2/2014 | Bieler | A63F 13/12 463/25 |
| 2014/0057722 A1* | 2/2014 | Justice | A63F 13/12 463/42 |
| 2014/0122200 A1* | 5/2014 | Granville | G06Q 30/0212 705/14.14 |
| 2014/0129342 A1* | 5/2014 | Sanghavi | G06Q 30/0277 705/14.66 |
| 2014/0148246 A1* | 5/2014 | Quan | A63F 13/10 463/24 |
| 2014/0168453 A1* | 6/2014 | Shoemake | H04N 5/23206 348/207.11 |
| 2014/0179426 A1* | 6/2014 | Perry | A63F 13/10 463/31 |
| 2014/0179436 A1* | 6/2014 | Karamfilov | A63F 13/12 463/32 |
| 2014/0184603 A1* | 7/2014 | Jacoby | G09G 5/14 345/428 |
| 2014/0189091 A1* | 7/2014 | Tamasi | H04L 43/0858 709/224 |
| 2014/0207950 A1* | 7/2014 | Badiee | H04L 43/08 709/224 |
| 2014/0243083 A1* | 8/2014 | Bae | A63F 13/332 463/31 |
| 2014/0267339 A1* | 9/2014 | Dowd | H04L 63/0428 345/581 |
| 2014/0274404 A1* | 9/2014 | Hoskins | A63F 13/795 463/42 |
| 2014/0287836 A1* | 9/2014 | Chan | H04L 67/1095 463/40 |
| 2014/0288918 A1* | 9/2014 | Orsini | G06F 17/289 704/2 |
| 2014/0337454 A1* | 11/2014 | Yamamoto | H04L 67/34 709/208 |

(56) References Cited

U.S. PATENT DOCUMENTS

| | | | |
|---|---|---|---|
| 2014/0349763 A1* | 11/2014 | Lanzoni | A63F 13/355 463/42 |
| 2014/0364203 A1* | 12/2014 | Nelson | G07F 17/3218 463/31 |
| 2015/0009222 A1* | 1/2015 | Diard | G06F 9/45533 345/505 |
| 2015/0099587 A1* | 4/2015 | Lees | A63F 13/33 463/42 |
| 2015/0099590 A1* | 4/2015 | Lee | A63F 13/70 463/42 |
| 2015/0105148 A1* | 4/2015 | Consul | G09G 5/363 463/31 |
| 2015/0105156 A1* | 4/2015 | Gault | A63F 13/10 463/31 |
| 2015/0120674 A1* | 4/2015 | Lavoie | G06F 9/45533 707/679 |
| 2015/0128293 A1* | 5/2015 | Hitomi | H04L 65/60 726/29 |
| 2015/0156278 A1* | 6/2015 | Perrin | A63F 13/53 463/31 |
| 2015/0273329 A1* | 10/2015 | Saito | A63F 13/355 463/42 |
| 2015/0297991 A1* | 10/2015 | Mahlmeister | A63F 13/22 463/29 |
| 2015/0324336 A1* | 11/2015 | Glezos | G06F 17/2247 715/234 |
| 2016/0110841 A1* | 4/2016 | Kamiyama | A63F 13/355 345/503 |
| 2016/0184712 A1* | 6/2016 | Colenbrander | A63F 13/79 463/29 |

FOREIGN PATENT DOCUMENTS

| | | |
|---|---|---|
| JP | 2009-260818 | 11/2009 |
| JP | 2012-090120 | 5/2012 |
| JP | 2012-125451 | 7/2012 |
| JP | 2013-004009 | 1/2013 |

* cited by examiner

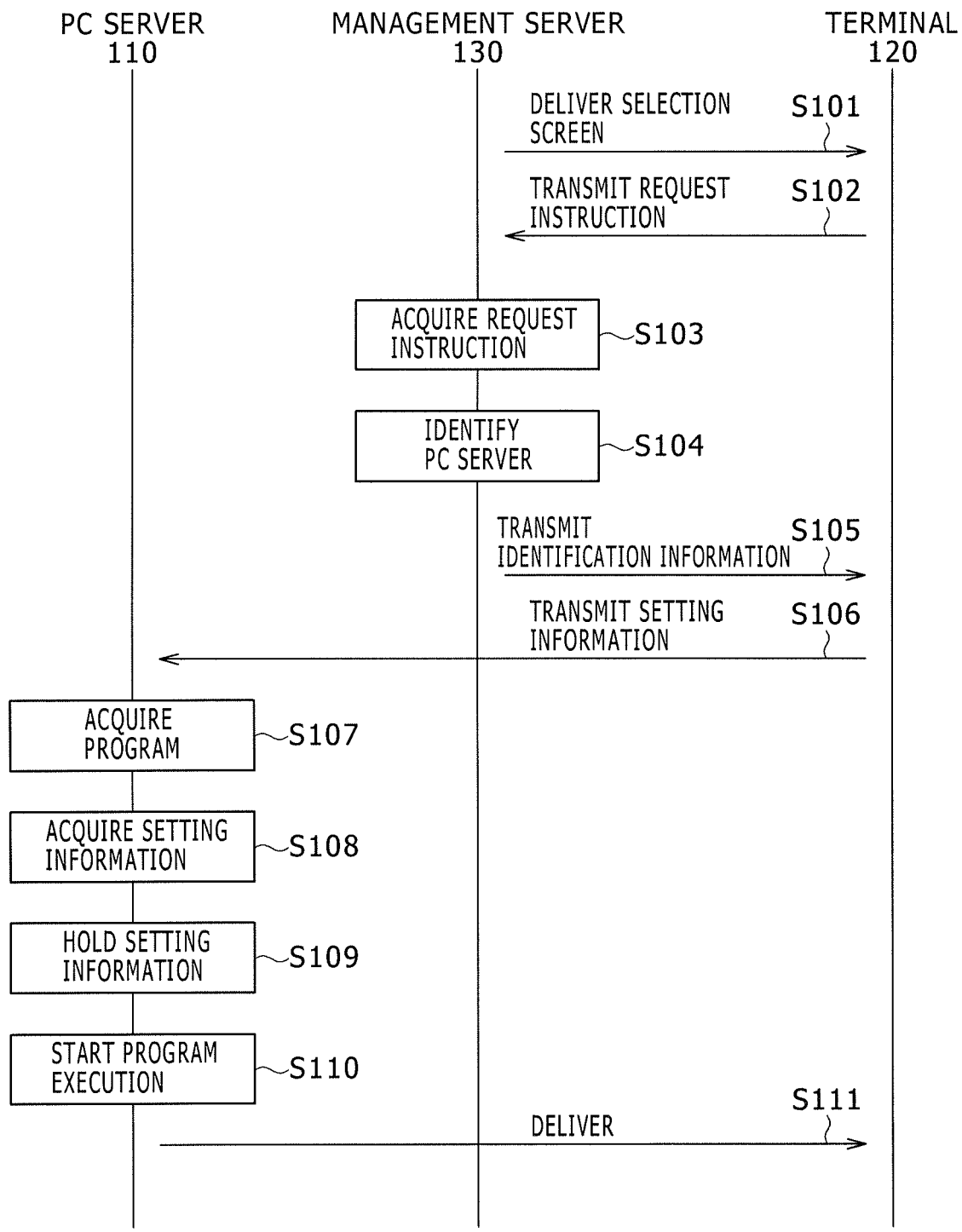

DELIVERY SYSTEM, DELIVERY METHOD, AND DELIVERY PROGRAM

BACKGROUND

The present disclosure relates to a delivery system, a delivery method, and a delivery program.

A cloud gaming technology of streaming type is known. In this technology, a game program is executed on the cloud side and image information generated by the execution of this game program is delivered to a terminal in a streaming manner.

SUMMARY

Here, if the terminal is a game device for example, there may occur a difference between the settings (language setting or button allocation setting, for example) of the game device and the settings that are reflected when a game is played at the cloud side. In this case, the problem that the user experiences discomfort or the terminal becomes difficult to operate may arise.

Therefore, it is desirable to realize a delivery system and so on configured to deliver the settings of a terminal side in a streaming manner by reflecting these settings onto the cloud side.

According to an embodiment of the present disclosure, there is provided a delivery system including a delivery apparatus. The delivery apparatus includes a setting information acquisition section configured to acquire setting information set to a terminal on which an application is executed on the basis of the setting information, a terminal section configured to have at least part of functions of the terminal and execute an application in accordance with an instruction from the terminal on the basis of the setting information acquired by the setting information acquisition section, and a delivery section configured to deliver image information based on the execution of the application to one of the terminal and a terminal related to the terminal.

According to another embodiment of the present disclosure, there is provided a delivery method. The delivery method includes acquiring setting information set to a terminal on which an application is executed on the basis of the setting information, having at least part of functions of the terminal and executing an application in accordance with an instruction from the terminal on the basis of the acquired setting information, and delivering image information based on the execution of the application to one of the terminal and a terminal related to the terminal.

According to a further embodiment of the present disclosure, there is provided a delivery program causing a computer system to function as a delivery unit. The delivery unit includes a setting information acquisition section configured to acquire setting information set to a terminal on which an application is executed on the basis of the setting information, a terminal section configured to have at least part of functions of the terminal and execute an application in accordance with an instruction from the terminal on the basis of the setting information acquired by the setting information acquisition section, and a delivery section configured to deliver image information based on the execution of the application to one of the terminal and a terminal related to the terminal.

According to a still further embodiment of the present disclosure, there is provided a terminal. The terminal includes a transmission section configured to transmit setting information to a delivery apparatus, a reception section configured to receive image information obtained by executing an application on the basis of the setting information in the delivery apparatus, and an output section configured to output the image information.

BRIEF DESCRIPTION OF THE DRAWINGS

FIG. 4 is an example of the outline of a flow of processing executed by the delivery system shown in FIG. 1.

DETAILED DESCRIPTION OF THE PREFERRED EMBODIMENT

Figure 1:
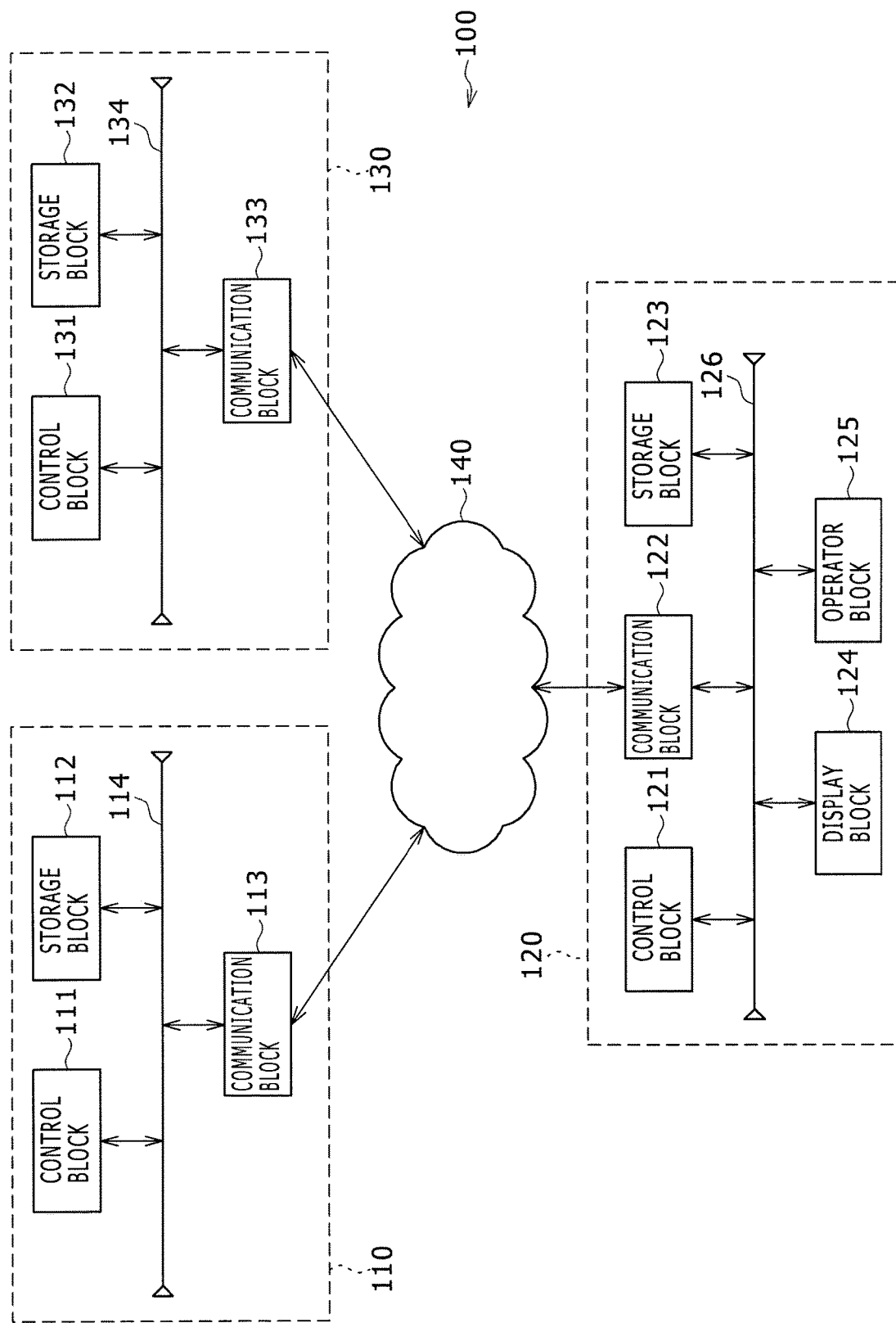
FIG. 1 is a schematic diagram illustrating an example of the outline of a hardware configuration of a delivery system practiced as one embodiment of the present disclosure.

The present disclosure will be described in further detail by way of an embodiment thereof with reference to the accompanying drawings. It should be noted that, in the drawings, identical or similar elements are denoted by the same reference symbols and the redundant description will be skipped.

Now, referring to FIG. 1, there is shown one example of the outline of a hardware configuration of a delivery system practiced as one embodiment of the present disclosure. As shown in FIG. 1, a delivery system 100 has a PC (personal computer) server 110, a management server 130, and a terminal 120 interconnected through a network 140 (the Internet for example).

As shown in FIG. 1, the PC server 110 has a control block 111, a storage block 112, and a communication block 113. The control block 111, the storage block 112, and the communication block 113 are interconnected through a bus 114. The control block 111 is a CPU (central processing unit) or the like for example and operates as instructed by a program stored in the storage block 112. The storage block 112 includes an information recording medium such as a hard disk drive, a ROM (read only memory), or a RAM (random access memory), for example, and holds programs that are executed by the control block 111. The storage block 112 also operates as a work memory of the control block 111. The communication block 113 is a network interface for example and transmits and receives information through the network 140 as instructed by the control block 111. Likewise, the management server 130 includes a control block 131, a storage block 132, and a communication block 133. The control block 131, the storage block 132, and the communication block 133 are interconnected through a bus 134. It should be noted that the hardware configuration of the management server 130 is substantially the same as that of the PC server 110, so that the description thereof will be skipped.

Now, the PC server 110 in the present embodiment includes a mother board having the function of a so-called PC server and at least one board having at least part of the functions of the terminal 120 (a game device for example). The part of the functions of the terminal 120 is a function of executing a game program corresponding to a game device for example. It should be noted that the PC server 110 executes streaming delivery of game images and so on generated by the function of the game device concerned as will be described later. It should also be noted that, in FIG.

1, only one PC server 110 is shown, but two or more PC servers 110 may be included in the above-mentioned configuration.

The terminal 120 includes a control block 121, a communication block 122, a storage block 123, a display block 124, and an operator block 125. Likewise, the control block 121 through the operator block 125 are interconnected by a bus 126. Like the PC server 110 described above, the control block 121 is a CPU or the like for example and operates as instructed by a program stored in the storage block 123. The communication block 122 is a network interface and transmits and receives information through the network 140 as instructed by the control block 121. It should be noted that, in FIG. 1, only one terminal 120 is shown, but two or more terminals 120 may be included.

The storage block 123 includes an information recording medium such as a hard disk drive, a ROM, or a RAM, for example and holds programs that are executed by the control block 121. The storage block 123 operates also as a work memory of the control block 121. The display block 124 is a liquid crystal display or an organic EL (electroluminescence) display, for example, and displays information as instructed by the control block 121. The operator block 125 includes an interface such as a keyboard, a mouse, a controller, and buttons, for example and outputs the contents of an instructive operation done by the user to the control block 121 in response to the instructive operation. To be more specific, the terminal 120 is equivalent to a game device and a television receiver, for example. The terminal 120 has functions of storing setting information such as account information to be described later and executing an application (a program) on the basis of this setting information. Here, the application is a game for example. The terminal 120 transmits setting information to the PC server 110. The PC server 110 executes applications on the basis of this setting information. These applications may be the same as those executed on the terminal 120 or may be different therefrom. Image information representative of the execution results of each application is transmitted from the PC server 110 to the terminal 120. The terminal 120 receives this image information and outputs the received image information to the display block 124.

It should be noted that each program that is processed by the control block 111 and the control block 121 described above may be provided by downloading through a network, for example, or provided in various types of computer-readable information recording media such as CD-ROM (compact disc-ROM) and DVD-ROM (digital versatile disc-ROM). Further, the above-mentioned configurations of the PC server 110 and the terminal 120 are illustrative only, so there is no limitation thereto. In addition, the above-mentioned configuration of the delivery system 100 is illustrative only and there is no limitation thereto, so that the delivery system 100 may be realized by use of so-called cloud technology, for example. Besides, in the FIG. 1, the case where one terminal 120 and one PC server 110 are used is described for the brevity of the drawing; it is also practicable to arrange two or more terminals 120 and two or more PC servers 110. Further, the PC server 110 is merely one example and therefore not limited to so-called PC servers.

Figure 2:
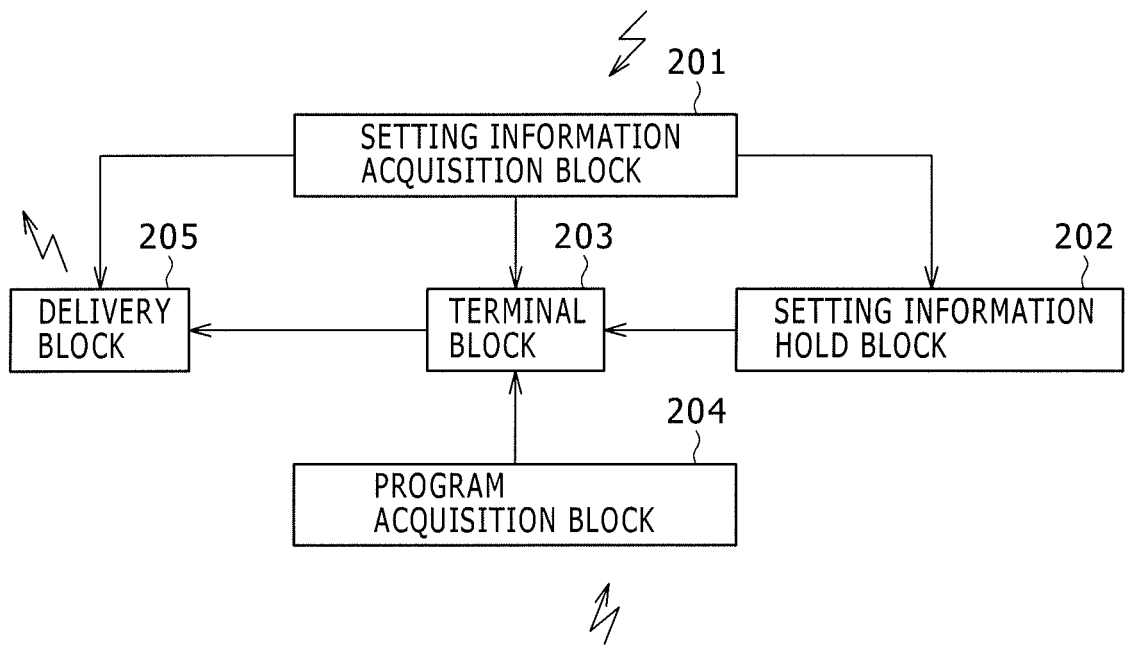
FIG. 2 is a block diagram illustrating an example of a functional configuration of a PC server shown in FIG. 1.

The following describes one example of a functional configuration of the PC server 110 in the present embodiment. As shown in FIG. 2, the PC server 110 functionally includes a setting information acquisition block 201, a setting information hold block 202, a terminal block 203, a program acquisition block 204, and a delivery block 205.

The setting information acquisition block 201 acquires setting information from the terminal 120. This setting information includes the setting information set to the terminal 120. Here, the setting information set to the terminal 120 includes a display language that is displayed in a delivered game image, a language of prediction dictionary for use in character input and/or information related with the allocation of two or more buttons and the like of the operator block 125 for use by the terminal 120, for example. In addition, the information related with the setting of time zone set to the terminal 120 may be included. It should be noted that, for the information related with the setting of time zone, a time held in the management server 130 to be described later may be used. Further, the setting information may include the information related with the allocation of controllers to ports included in the controller port in the terminal 120, for example.

Further, the setting information may include information representative of the account for a network environment that is realized by the delivery system 100 or information related with a network bandwidth available to the terminal 120 and an output type of the terminal 120. It should be noted that the PC server 110 may acquire setting information from an apparatus other than the terminal 120, such as acquiring information related with a time zone from the management server 130 to be described later. Here, the information representative the account includes user identification information (an account ID for example) and an access token that is information necessary for sign-in to a network concerned, for example. In addition, the information related with the output type of the terminal 120 includes information representative of the output resolution (720p, 480p or 576p for example) of the terminal 120, for example. Besides, information related with whether or not the three-dimensional mode is adopted in video outputting may be included. To be more specific, for example, this information is equivalent to information representative of whether or not the information can be displayed in the three-dimensional mode on the terminal 120. For example, if the display block 124 of the terminal 120 is configured by a display apparatus capable of three-dimensional display such as a three-dimensional television or the like and the display mode of the terminal 120 is set to the three-dimensional mode so that the control block 121 generates images for three-dimensional display including a right-eye image and a left-eye image and supplies the generated images to the display block 124, the setting information acquisition block 201 acquires setting information indicative that the three-dimensional mode is set. In this case, the images for three-dimensional display including a right-eye image and a left-eye image are transmitted from the delivery block 205 of the PC server 110 to the terminal 120.

The setting information hold block 202 holds the setting information acquired by the setting information acquisition block 201. It should be noted that the setting information hold block 202 may be included in the terminal block 203, for example.

The program acquisition block 204 acquires an application program (hereafter referred to as a program) corresponding to an instruction issued from the terminal 120. It should be noted that this program may be stored in the storage block 112 of the PC server 110 or another storage block.

The terminal block 203 has at least part of the functions of the terminal 120 and executes programs acquired by the program acquisition block 204 on the basis of the setting information held in the setting information hold block 202.

To be more specific, if the terminal 120 is a predetermined game device for example, then the terminal block 203 is a board configured to realize at least part of the functions of the game device concerned and is equivalent to a board connected to the mother board of the PC server 110. When the board concerned is connected to the mother board of the PC server 110, a game executable on the terminal 120 (a predetermined game device for example) is executed on the terminal block 203 of the PC server 110 including the board concerned and delivered to the terminal 120. It should be noted that, in this case, it is obvious that the terminal block 203 executes the program in accordance with the operation information issued from the terminal 120. In addition, the program acquisition block 204 acquires a program selected by the user as will be described later from the storage block 112, for example.

The delivery block 205 delivers image information and the like based on the program executed by the terminal block 203 to the above-mentioned terminal 120. It should be noted that the delivery block 205 delivers the image information and the like to the above-mentioned terminal 120 in accordance with the setting information. To be more specific, if the setting information includes information related with network bandwidth, the delivery block 205 delivers the image information and the like to the terminal 120 in accordance with this information related with network bandwidth, for example.

Figure 3:
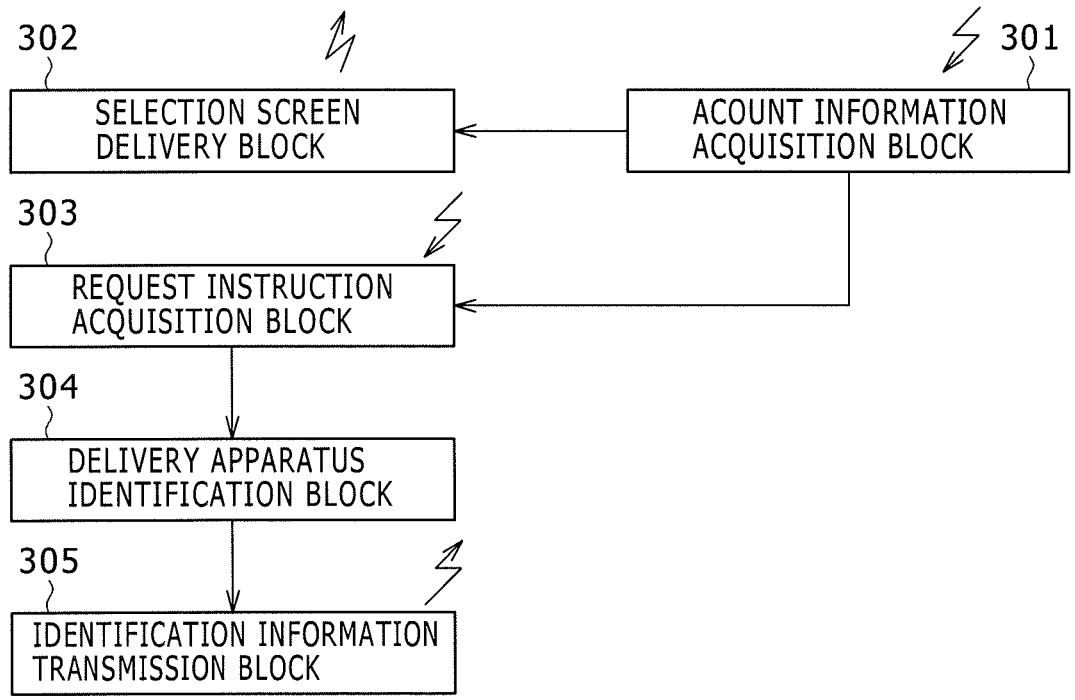
FIG. 3 is a block diagram illustrating an example of a functional configuration of a management server shown in FIG. 1.

The following describes one example of the functional configuration of the management server 130 in the present embodiment. As shown in FIG. 3, the management server 130 functionally includes an account information acquisition block 301, a selection screen delivery block 302, a request instruction acquisition block 303, a delivery apparatus identification block 304, and an identification information transmission block 305.

The account information acquisition block 301 acquires account information from the terminal 120. To be more specific, the account information acquisition block 301 acquires an account ID and the like that are acquired when signing in a network provided by the delivery system 100.

The selection screen delivery block 302 delivers a selection screen of programs provided by the delivery system 100 to the terminal 120, for example. This selection screen is referenced by the user on the display block 124 of the terminal 120, for example.

The request instruction acquisition block 303 acquires a request instruction for starting the execution of a selected program. To be more specific, the request instruction acquisition block 303 selects on the above-mentioned selection screen a program selected by the user on the terminal 120 and acquires a request instruction for requesting the start of this program, for example. This request instruction includes program identification information for identifying each selected program, for example. It should be noted that the request instruction acquisition block 303 may acquire program identification information separate from a request instruction concerned, for example.

The delivery apparatus identification block 304 identifies the PC server 110 by which a program concerned is executed.

The identification information transmission block 305 transmits the identification information used to identify the identified PC server 110 to the terminal 120. This identification information includes setting information request information for requesting the terminal 120 for setting information. It should be noted that, separate from this identification information, the above-mentioned setting information request information may be included. In addition, this identification information may include the above-mentioned program identification information. Then, the terminal 120 transmits the setting information corresponding to the setting information request information to the PC server 110 corresponding to this identification information, for example. It should be noted that the setting information request information may include information related with a time zone in the management server 130 and so on.

The following describes one example of the outline of a flow of processing by the delivery system 100 in the present embodiment. It should be noted that the flow to be described below is merely one example and therefore not limited to the flow to be described below.

As shown in FIG. 4, the selection screen delivery block 302 of the management server 130 delivers the selection screen of programs provided by the delivery system 100 to the terminal 120 in accordance with the sign-in of the user in the network concerned (S101).

In the terminal 120, the user selects a desired program on the selection screen delivered from the management server 130 and, in accordance with this selection, the terminal 120 transmits program identification information for identifying the selected program and a request instruction including a request instruction for requesting the start of the selected program to the management server 130 (S102).

The request instruction acquisition block 303 of the management server 130 acquires this request instruction (S103). The delivery apparatus identification block 304 of the management server 130 identifies the PC server 110 by which the program concerned is executed (S104) and the identification information transmission block 305 of the management server 130 transmits the identification information for identifying the identified PC server 110 to the terminal 120 (S105). It should be noted that this identification information includes setting information request information for requesting the terminal 120 for setting information as described above, for example.

The terminal 120 transmits the setting information set to the terminal 120 corresponding to the setting information request information and program identification information for identifying the selected program to the PC server 110 identified by the above-mentioned identification information (S106).

The program acquisition block 204 of the PC server 110 acquires a program identified by the above-mentioned program identification information (S107). The setting information acquisition block 201 acquires setting information from the terminal 120 (S108). The setting information hold block 202 holds the setting information acquired by the setting information acquisition block 201 (S109). On the basis of the setting information held in the setting information hold block 202, the terminal block 203 starts executing the program acquired by the program acquisition block 204 (S110). The delivery block 205 delivers image information to the terminal 120 on the basis of the execution on the terminal block 203 (S111). As described above, streaming delivery is started. It should be noted that, instead of transmitting the image information to the terminal 120 from which setting information was transmitted to the PC server 110, the delivery block 205 may transmit the image information to another terminal 120 (a related terminal) related with that terminal 120. A related terminal is a terminal 120 used or owned by the same user. By receiving the address of the terminal 120 used or owned by the same user from the terminal 120 and storing the received address in advance, the PC server 110 can determine the mutually related terminals 120 with any timing. Thus, if an application is normally executed with certain settings on a certain terminal 120 (a stationary personal computer or a stationary game machine, for example), a configuration in which the PC server 110 transmits image information to another terminal 120 in the above-mentioned manner allows the displaying of image information that is a result of the execution of an application with the same settings on another related terminal 120 (a smartphone or a portable game machine used or owned by the same user, for example), thereby enhancing user convenience.

While a preferred embodiment of the present disclosure has been described using specific terms, such description is for illustrative purpose only, and it is to be understood that changes and variations may be made. For example, the configuration shown in the embodiment described above may be replaced by a configuration substantially the same as the above-mentioned configuration, a configuration providing the substantially the same effects as those of the above mentioned embodiment, or a configuration achieving the substantially the same objective as that of the above-mentioned embodiment. For example, in the description made above, an example in which the PC server 110 includes one board including at least one of the functions of the terminal 120 has been described; however, it is also practicable for each PC server 110 to include two or more boards mentioned above. It should be noted that a delivery apparatus in the claims is equivalent to the PC server 110 and a management apparatus is equivalent to the management server 130, for example.

The present disclosure contains subject matter related to that disclosed in Japanese Priority Patent Application JP 2014-014948 filed in the Japan Patent Office on Jan. 29, 2014, the entire content of which is hereby incorporated by reference.

What is claimed is:

1. A delivery system comprising:
a plurality of terminals;
a delivery apparatus, the delivery apparatus including
a setting information acquisition section configured to acquire, over a network, setting information specific for a gaming application from a plurality of gaming applications from a terminal from the plurality of terminals when a request is made to the delivery apparatus for execution of the gaming application, wherein the setting information is stored on the terminal from the plurality of terminals prior to execution of the gaming application, and
wherein the setting information includes execution requirements of the terminal for the gaming application which are used during execution of the gaming application by the delivery apparatus, and
wherein, for each of the plurality of gaming application, the setting information for gaming application is separately stored in association with the gaming application;
a terminal section configured to have at least part of functions of the terminal and execute the gaming application using a plurality of gaming application settings stored in the setting information, and
a delivery section configured to deliver image information from the executed gaming application to the terminal, wherein the image information delivered to the terminal is modified based upon the execution requirements in the setting information for the gaming application, and
wherein the setting information includes information related with a system display language set to the terminal used to display text in the gaming application, and wherein the setting information includes information related with a system display language set to the terminal used to display text in the gaming application on the terminal.

2. The delivery system according to claim 1, further comprising
a management apparatus,
wherein the management apparatus verifies the terminal using identification information acquired from the terminal prior to allowing the delivery apparatus to execute the gaming application.

3. The delivery system according to claim 1, wherein the setting information includes operation-related information indicative of a correlation between a plurality of operation blocks included in an operation section connected to the terminal and a plurality of pieces of operation information used in the gaming application.

4. The delivery system according to claim 1, wherein the setting information includes information related with a network bandwidth available to the terminal.

5. The delivery system according to claim 1, wherein the setting information includes resolution information related with a resolution of the terminal.

6. The delivery system according to claim 1, wherein the setting information includes time zone information related with a time zone in which the terminal is located.

7. The delivery system according to claim 1, wherein the setting information includes display information indicative of whether display in a three-dimensional mode is enabled or not.

8. The delivery system according to claim 1, wherein the setting information includes information related with allocation of controllers to ports included in controller ports in the terminal.

9. The delivery system according to claim 1, wherein the delivery apparatus includes
a mother board having functions of a PC server, and
a plurality of boards connected to the mother board and having at least part of functions of the terminal.

10. A delivery method comprising:
acquiring, over a network from a terminal, setting information specific for a gaming application from a plurality of a gaming applications from a terminal from the plurality of terminals when a request is made to the delivery apparatus for execution of the gaming application;
wherein the setting information is stored on the terminal from the plurality of terminals prior to execution of the gaming application,
wherein the setting information includes execution requirements for the terminal which is executing the gaming application on the terminal using the setting information,
wherein the setting information includes a plurality of gaming application settings used for executing the gaming application, and
wherein, for each of the plurality of gaming application, the setting information for each gaming application is separately stored in association with the gaming application; and
delivering image information based on the execution of the gaming application to one of the terminal and a terminal related to the terminal,
wherein the image information is modified based upon the execution requirements in the setting information specific for the gaming application, and wherein the setting information includes a display language for the gaming application, and wherein the setting information includes a display language for the gaming application program.

11. The delivery system according to claim 1, wherein the setting information includes a language of a prediction dictionary for use in character input in the gaming application program.

12. A delivery system comprising:
a first terminal;
a second terminal;
a delivery apparatus, the delivery apparatus comprising:
a setting information acquisition section configured to acquire, over a network, setting information specific for a gaming application from a plurality of gaming applications from the first terminal when a request is made to the delivery apparatus for execution of the gaming application,
wherein the setting information is stored on the first terminal prior to execution of the gaming application,
wherein the setting information includes execution requirements of the first terminal, execution requirements of the second terminal, and a network address of the second terminal,
wherein the execution requirements of the second terminal are used during execution of the gaming application by the delivery apparatus,
wherein, for each of the plurality of gaming applications, the setting information for each gaming application is separately stored in association with the gaming application, and
wherein the setting information includes information related with a system display language used to display text in the gaming application;
a terminal section configured to have at least part of functions of the second terminal and execute the gaming application using a plurality of gaming application settings stored in the setting information, and
a delivery section configured to deliver image information from the executed gaming application to the second terminal using the address of the second terminal,
wherein the image information delivered to the second terminal is modified based upon the execution requirements of the second terminal contained in the setting information specific for the gaming application.

13. The delivery system according to claim 12,
wherein the delivery apparatus compares a first user identity associated with the first terminal to a second user identity associated with the second terminal, and
wherein the delivery section only delivers image information to the second terminal if the first user identity matches the second user identity.

* * * * *